Nov. 20, 1962 E. R. ANDERSON 3,064,794
FRUIT ORIENTATOR
Filed May 26, 1960
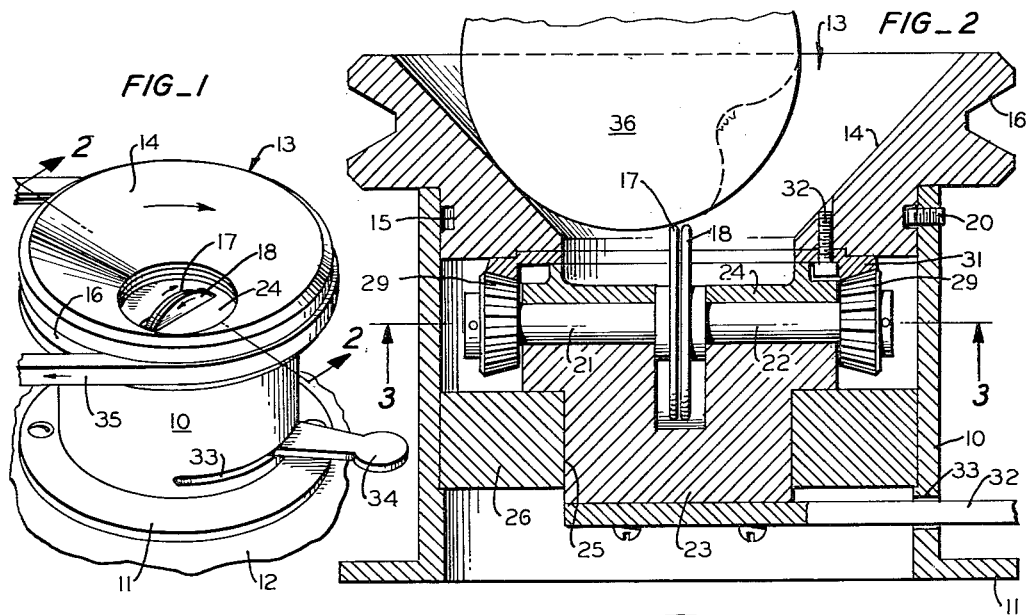
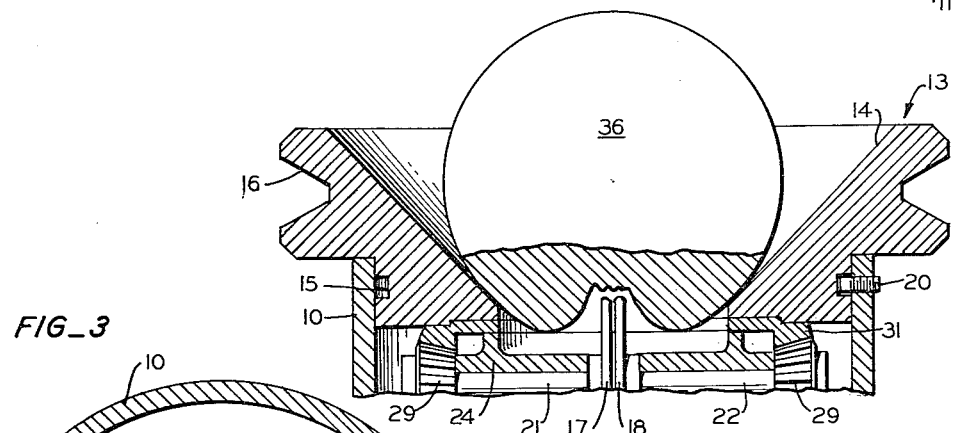
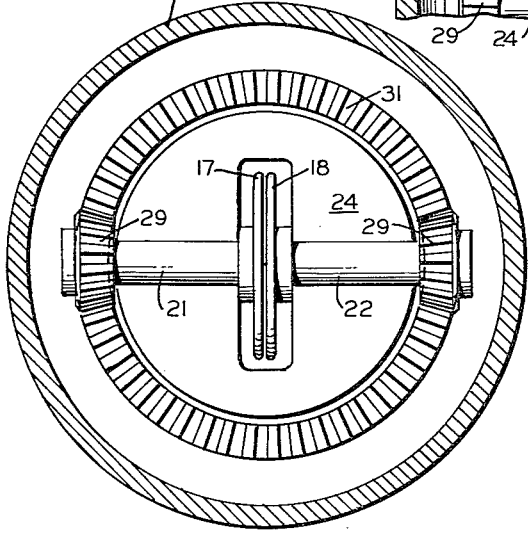
INVENTOR.
EARL R. ANDERSON
BY
Allen and Chromy
ATTORNEYS

United States Patent Office 3,064,794
Patented Nov. 20, 1962

3,064,794
FRUIT ORIENTATOR
Earl R. Anderson, Campbell, Calif., assignor, by mesne assignments, to Filper Corporation
Filed May 26, 1960, Ser. No. 31,971
9 Claims. (Cl. 198—33)

The present invention relates to orientators for fruit particularly orientators which engage an indent in the fruit either at the stem or the blossom end thereof so as to place the stem-blossom axis in a predetermined position, and also in the case of fruit having a suture plane so as to place the suture plane in a predetermined orientation.

Fruit such as apples, for example, having indents both at the stem and at the blossom end, and if either indent is located directly over a support, the stem-blossom axis will be generally vertical. Fruit such as peaches have an indent at the stem end, which is elongated in the direction of the plane of the suture of the fruit and by properly orientating the indent such fruit is oriented both with relation to the stem-blossom axis and also with relation to the plane of the suture of the fruit.

In previous orientators employing means engaging the stem indent, it has been difficult to maintain the fruit in oriented position, particularly certain irregularly formed fruit, because of the tendency of the fruit-orientating device to displace the fruit after it has been oriented.

It is the general object of my invention to provide an improved fruit orientator wherein there is no tendency of the fruit orientating device to displace the fruit from oriented position after it has entered the fruit cavity.

It is another object of the inventtion to provide a fruit-orientating device wherein the means is provided for rotating or shifting the fruit in seeking or hunting the cavity, and the direction of rotation will be rapidly changed upon re-positioning of the fruit or rocking of the fruit from one side to the other so that more frequent shifting of the fruit is obtained during the hunting operation.

A further object of the invention is to provide means for hunting the stem indent of a fruit wherein the shifting of the fruit with reference to the indent-hunting device is accomplished effectively.

Other objects and advantages of the invention will be apparent from the following description of a preferred embodiment thereof, made with reference to the attached drawings, in which:

FIG. 1 is a perspective view of my fruit orientation device.

FIG. 2 is a vertical enlarged section taken in a plane indicated by the line 2—2 in FIG. 1.

FIG. 3 is a transverse sectional view taken as indicated by the line 3—3 in FIG. 2.

FIG. 4 is a fragmentary view similar to FIG. 2 showing the fruit after it has been placed in oriented position with respect to the orienting device.

In the instant invention, the fruit-orientating device includes a cylindrical frame 10 having a bottom flange 11 by means of which it may be secured on a suitable support 12. This cylindrical frame 10 supports in journalled fashion at its upper end a cup 13 having a generally frusto-conical inner cavity 14 which faces upwardly and having a V-belt groove 16 at its outer periphery. The cup 13 is provided with an annular groove 15 which is engaged freely by the inner ends of a plurality of retaining screws 20 threaded in the frame 10. The cup cavity 14 is open at the bottom, and disposed in this opening is a pair of orientating wheels 17 and 18, which are carried by respective shafts 21 and 22 journalled about a horizontal axis in split bearings formed by a support member 23 and a cap member 24 resting freely in place. The support member 23 is journalled or pivoted at its lower reduced portion 25 in a sleeve 26 secured by a press-fit in the frame 10. The two shafts 21 and 22 carry at their respective outer ends respective bevel pinions 29 which mesh with a ring gear 31 secured by screws 32 to the bottom face of the cup 13. The ring gear 31 and the cup 13 hold the cap member 24 in place.

Secured to the bottom face of the reduced lower end 25 of the support member 23 is a manually operable oscillating arm 32 which extends outwardly through a slot 33 in the frame 10 and is provided with a handle 34 for manipulation by an operator so that the plane of operation of the wheels 17 and 18 may be varied as desired about a vertical axis coincident with the vertical axis of the cup 13.

In operation, with the cup 13 being driven by its belt 35, the device may be used by placing a fruit, for example, an apple, within the cavity 14 of the fruit support or cup so that its weight is at least partially supported by one or both of the wheels 17 and 18. With the cup 13 rotating and with the wheels 17 and 18 rotating in opposite directions as indicated by the arrows in FIG. 1, a plurality of differently directed forces are applied to the fruit 36 so that it is continually shifted and moved about within the cup 14 in an effort to find or locate one of the cavities at the ends of the stem-blossom axis. When this cavity is located the fruit will settle over the wheels 17 and 18 with the wheels within the cavity but the fruit supported substantially and entirely by the cup 13 so that with regularly formed fruit there is little or no tendency to be displaced. If the fruit is irregularly formed so that a portion projects into the normal cavity, the fact that the wheels 17 and 18 rotate in opposite directions, tend to prevent the fruit from being displaced by this reason.

In general it would be noted that the cup 13 serves two purposes, the first of which is to provide a general locating support for the fruit 36 so as to maintain the fruit within a centering zone, and the second is to provide a shifting effect on the gruit by virtue of the rotation of the cup 13. It is obvious, however, that the wheels 17 and 18 could be employed with other means for supporting the fruit in its orientating location, such as for example by a stationary cone disposed within the rotating cone 14 or by other suitable support means which would locate the fruit in the general region of the orientating wheels 17 and 18 so as to be supported thereon and be subjected to the orientating effect of these wheels.

While I have shown and described a preferred form of the invention, it will be apparent that the invention is capable of variation and modification from the form shown so that the scope thereof should be limited only by the scope and interpretation of the claims appended hereto.

I claim:

1. In an orientator for fruit of the type having a cavity at an end of the stem-blossom axis, fruit support means, a pair of cavity-locating elements positioned to engage a lower surface of a fruit operatively related to said support means, means for mounting said elements in side-by-side adjacency, and means for moving said elements in parallel but opposite directions to effect an orienting action on the fruit while maintaining said side-by-side adjacency, whereby when the fruit is located in said support with the indent located and registering with said elements, the opposite movement of said elements tends to prevent dislocation of the fruit from its oriented position.

2. In an orientator for fruit of the type having a cavity at an end of the stem-blossom axis, fruit support means, a cavity-locating structure related to said support means and positioned to engage a lower surface of a fruit in said support means, said structure comprising a pair of adjacent elements movably mounted with respect to said support means and having upper fruit engaging portions in side-by-side adjacency, and means for moving said elements relative to each other in parallel but opposite directions to effect movement of a fruit when not seated in the indent thereof to effect an orienting action on the fruit while maintaining said side-by-side adjacency.

3. In an orientator for fruit of the type having a cavity at an end of the stem-blossom axis, a cavity-locating structure positioned to engage a fruit, said structure comprising a pair of adjacent elements having upper fruit engaging portions in side-by-side adjacency, and means for moving said elements relative to each other in parallel but opposite directions to effect movement of a fruit when not seated in the indent thereof to effect an orienting action on the fruit while maintaining said side-by-side adjacency.

4. In an orientator for fruit of the type having a cavity at an end of the stem-blossom axis, fruit support means, a pair of cavity-locating disks positioned to engage a lower surface of a fruit operatively related to said support means, means for mounting said disks in side-by-side adjacency, and means for rotatively moving said disks in opposite directions, whereby when the fruit is located in said support with the indent located and registering with said disks, the opposite movement of said disks tends to prevent dislocation of the fruit from its oriented position.

5. In an orientator for fruit of the type having a cavity at an end of the stem-blossom axis, fruit support means, a cavity-locating structure related to said support means and positioned to engage a lower surface of a fruit in said support means, said structure comprising a pair of adjacent disk elements mounted in operative relation to said support means and having their upper fruit engaging portions in side-by-side adjacency, and means for rotatably moving said disk elements relative to each other to effect movement of a fruit when not seated in the indent thereof.

6. In an orientator for fruit of the type having a cavity at an end of the stem-blossom axis, a cavity-locating structure positioned to engage a lower surface of a fruit, said structure comprising a pair of adjacent disk elements having their upper fruit engaging portions in side-by-side adjacency, and means for rotatably moving said disk elements relative to each other to effect movement of a fruit when not seated in the indent thereof.

7. In an orientator for fruit of the type having a cavity at an end of the stem-blossom axis, fruit support means, a cavity-locating structure related to said support means and positioned to engage a lower surface of a fruit in said support means, said structure comprising a pair of adjacent disk elements mounted in operative relation to said support means and having their upper fruit engaging portions in side-by-side adjacency, means for rotatably moving said disk elements relative to each other to effect movement of a fruit when not seated in the indent thereof, and means for effecting relative rotation between said support means and said disk elements about a vertical axis.

8. In a fruit orientation device, a frame, a fruit cup mounted for rotation in said frame, said fruit cup providing an upwardly facing cavity and having a bottom recess, means for rotating said cup, a pair of adjacent orientating elements mounted for rotation about a substantially horizontal axis and extending upwardly into the recess of said cup, and a driving connection between said cup and said elements to cause rotative movement of said elements in opposite directions.

9. In a fruit orientation device, a frame, a fruit cup mounted for rotation in said frame, said fruit cup providing an upwardly facing cavity and having a bottom recess, means for rotating said cup, a pair of adjacent orientating disk elements extending upwardly into the recess of said cup, a bearing structure carried by said frame, respective shafts journalled in said bearing structure, and a driving connection between said cup and said elements to cause movement of said elements in opposite directions.

References Cited in the file of this patent
UNITED STATES PATENTS
2,720,962    Metcalf _____ Oct. 18, 1955